United States Patent Office.

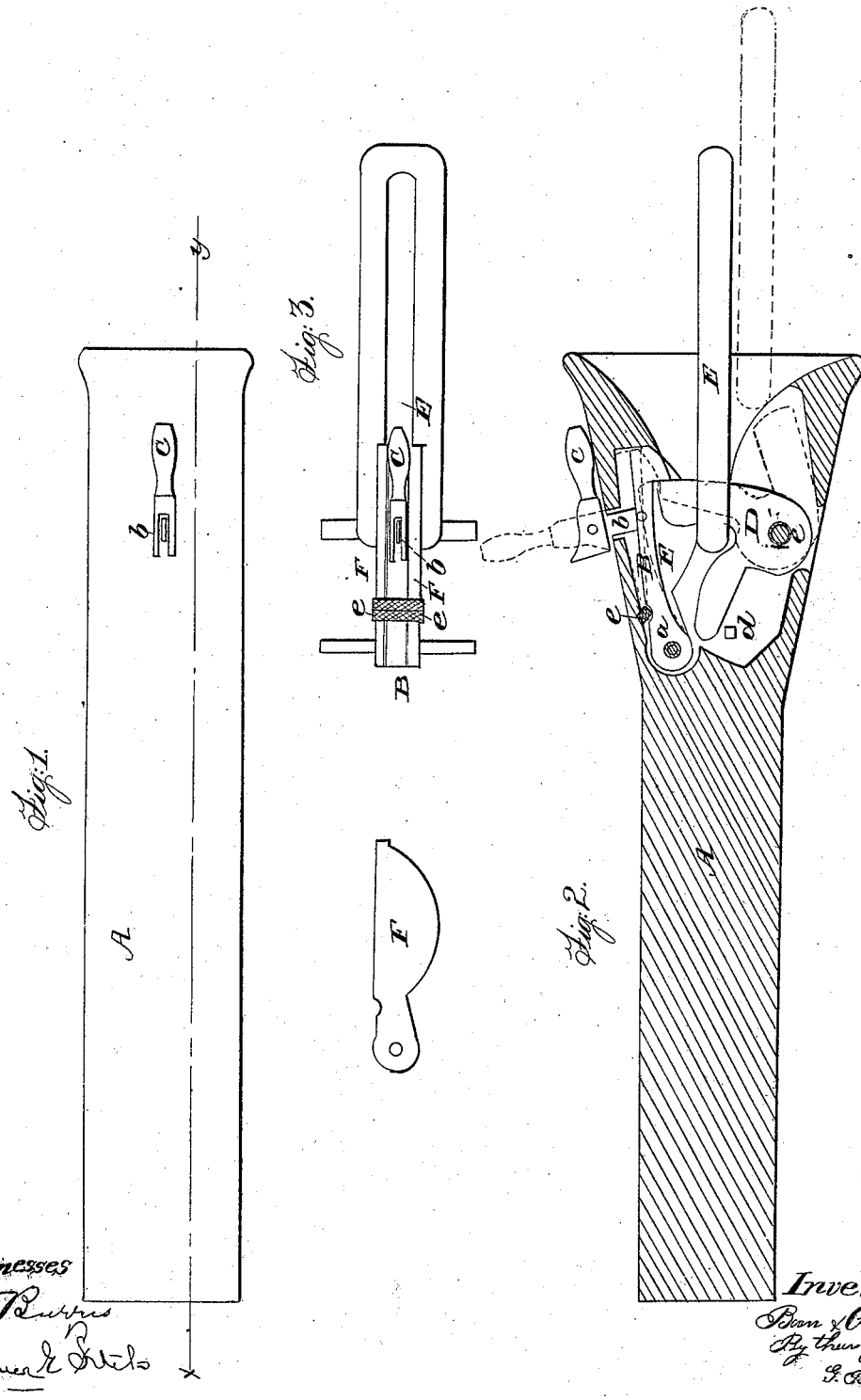

ALONZO T. BOON AND DAVID M. ORSBORN, OF GALESBURG, ILLINOIS, ASSIGNORS TO A. T. BOON AND T. R. MARKILLIE.

Letters Patent No. 63,696, dated April 9, 1867

IMPROVED CAR-COUPLING.

The Schedule referred to in these Letters Patent and making part of the same.

TO ALL WHOM IT MAY CONCERN:

Be it known that we, ALONZO T. BOON and DAVID M. ORSBORN, of the city of Galesburg, in the county of Knox, and State of Illinois, have invented a new and useful Improvement in Car-Couplings; and we do hereby declare the following to be a full, clear, and exact description of the construction and operation of the same reference being had to the accompanying drawings, making a part of this specification, in which—

Figure 1 is a top view of the draw-bar of a car.

Figure 2, a longitudinal vertical section as indicated by the line x y, in fig. 1, in which section our improvement is clearly set forth.

Figure 3, a top view of our improvement detached from the draw-bar.

Like letters in the different figures of the drawings indicate like parts.

Our invention relates to the manner of coupling the cars through their draw-bars, by a simple contrivance, consisting particularly of a dog or actuating pivoted spring-catch and curved guides, operating in combination with a pivoted forked arm, whereby the moment the link comes in contact with the left arm of the fork it is instantly thrown back from its vertical position, and the right arm of the fork immediately thrown up through the link, which being directed by the guides is caught by the spring-catch, and is thus held by the same until released by a peculiarly formed cam-lever or rod on the outside of the draw-bar, operating in its connection with the catch, consequently, through the instrumentality of the lever, spring-catch, and guides, operating in combination with the forked arm, as above remarked, a brakesman or the proper person may couple or uncouple the cars with facility and convenience.

To enable others skilled in the art to make and use our invention, we will proceed to describe its construction and operation.

A is the draw-bar; B the dog or actuating spring-catch; C the lever; D the pivoted forked arm; E the link. The draw-bar is constructed of two half pieces, in order that the different parts above mentioned may be inserted in recesses properly constructed on the inner sides of the pieces, near the mouth of the buffer, to receive them. The catch is of the form represented in fig. 2; it is secured by a pivot, $a$, which extends through it, and the two pieces, when put together, forming the draw-bar. The lever is connected with the catch by a plate, $b$, one end of which is inserted through a slot in the catch, and fastened to it by a pin or bolt, or in such a manner as will best secure it. The other end is inserted in a slot or opening constructed in the end and through the sides of the lever, (see fig. 3,) to admit of the plate operating freely therein when elevated for the release of the link, as seen in red lines. The plate is secured to the lever by a pivot passed through it and the plate. The forked arm is of the form seen in fig. 2. It is secured by a staunch pivot, $c$, passed entirely through the draw-bar and the arm. The left arm of the fork, in its projection backwards, by the link coming in contact with it in coupling, is regulated by the stop $d$, which permits it to come just far enough to be caught by the catch. On each side of the catch are the curved guides F (see clearly fig. 3, and a representation of one of them detached from the pivot of the catch.) These guides are placed on the pivot of the catch, and operate freely and independently of the same. To enable the catch and the guides to perform their functions properly, a stout India-rubber bar, $e$, is placed transversely over them, (see figs. 2 and 3,) so that the catch and the guides are thus kept well down, and hence, when the right arm of the fork is thrown up by the action of the link, and when coming in contact with the lip of the catch, the catch is forced up, which, compressing the rubber bar or spring, it is depressed to its original position after passing the lip, and the arm is thus held securely back of and against the lip. The object of the guides is that (when the link after entering the mouth of the buffer) their curves tend to depress the link if it becomes elevated too much when it strikes them, and they thus keep it to a steady and straight position; and moreover, when the right arm of the fork has secured the link in the manner as has been referred to, the guides, by their own gravity, and the action of the rubber spring thereon, serve to keep the link down, and hence prevent any unnecessary movement of the same over the arm. The parts in the draw-bar constituting the device herein described are to be of the most substantial character, and secured within the same in the best manner sufficiently to withstand the usual concussion to which the draw-bars are subjected in coupling.

The manner of elevating the catch from the top of the draw-bar, for the release or uncoupling of the link by the lever, may be made to vary so as to enable the same to be done from the top of the cars, as is desirable sometimes, by a rod connecting with the lever, and reaching high enough for a person to take hold of. The lever is so constructed at the end as to resemble the shape of a foot, as will be observed, which acts as a cam when the lever is raised up, and if it is found that the link is not uncoupled readily, by pressing the link back on the toe of the foot, the catch will clear the arm entirely, and thus release the link from its hold.

Operation: The position of the link on or about entering the buffer of the draw-bar, when it is desired to couple the cars, is indicated in red lines, and when it reaches the left arm of the fork (seen in red lines) it forces it back to the stop; consequently the right arm is instantly thrown up through the link, and, passing the lip of the catch, is caught back of it, and thus held, and the cars are thereby coupled automatically. The position of the lever and catch, when the link is released or uncoupled from the arm, is indicated in red lines.

Having thus fully described our invention, what we claim as new, and desire to secure by Letters Patent, is—

The pivoted catch or dog B, curved guides F, rubber bar e and lever C, as arranged and combined, and operating in combination with the forked arm D and link E, substantially in the manner and for the purpose as herein set forth.

ALONZO T. BOON,
DAVID M. ORSBORN.

Witnesses:
   ZIMRI POND,
   JOEL LEE.